Patented Aug. 14, 1934

1,969,730

UNITED STATES PATENT OFFICE 1,969,730

PROCESS OF IMPROVING SWEET CORN FOR PRESERVING

Milo R. Daughters, Portland, Oreg., assignor to Frosted Foods Company, Inc., Dover, Del., a corporation of Delaware No Drawing. Application October 24, 1931, Serial No. 570,973

6 Claims. (Cl. 99—8)

This invention relates to the preparation of sweet corn for preservation in any manner adapting it for storage and distribution, and consists in a novel process of rendering the full grown grains of sweet corn more tender and palatable than heretofore.

One of the most successful methods of preserving sweet corn is by freezing or quick freezing it and the present invention may be practiced with good advantage in connection with this method of preservation, although it is not limited in its application thereto. Broadly stated, my invention is characterized by the step of softening or dissolving the tough or chitinous-like covering of the sweet corn grains by blanching them in a caustic solution preparatory to any preserving process. When sweet corn is small of grain and relatively immature, the grain is soft and tender and palatable throughout its entire structure. However, at this stage the corn is lacking in flavor and also in bulk so that the yield of edible material from the grains on the cob is very small. As sweet corn becomes more mature, the covering of the individual grains becomes harder and tougher and more indigestible and this occurs by the time the roasting-ear stage is reached. Heretofore, the producer has been confronted with the alternative of a small yield of tender grain of poor and uncertain flavor or a high yield and rich flavor in grains inclined to be tough and relatively indigestible. It is this problem which the present invention has successfully solved in that it permits the producer to utilize the fully flavored and full grown grain, but to impart to it substantially the delicate and desirable young-grain texture. I have discovered that the objectionably tough covering of the plump, full grown grains of sweet corn, either on the cob or in the so-called "whole grain" condition, may be removed or softened by treating the grains with a caustic alkali solution of the proper strength and under the proper conditions. In most instances the treatment of the corn grains with a weak solution of sodium hydroxide will produce a marked degree of improvement in the tenderness of the grains. My invention contemplates the practice of this step under controlled conditions in accordance with which the action of the caustic solution is brought to a termination after the proper interval by removing or neutralizing it. To effect the desired results the corn on the cob, or the whole grain corn, after the alkali treatment, may be washed with a dilute solution of hydrochloric acid and in this case any excess caustic soda is converted to sodium chloride (table salt) and water which are beneficial rather than otherwise in the product.

While it is preferable to use a solution of caustic soda as a solvent for the tough covering of the sweet corn grains, other caustic alkalies may be used if preferred. Potassium hydroxide or caustic potash is entirely suitable for this purpose and neither the free alkali nor the salts thereof are at all objectionable in small quantities in the product. Other strong alkalies, for example, strontium hydroxide or lithium hydroxide may be used if desired but these are not preferred since their removal at the conclusion of the tendering step involves somewhat more effort.

The full benefit of my invention may be obtained by packaging and freezing the sweet corn thus prepared. It is important to prevent any substantial loss of moisture from the grains while in storage or in transit to the consumer as such losses not only impair the flavor but toughen the structure of the grains. The removal of the natural covering of the grains, moreover, leaves them more susceptible to evaporation losses than when they remain in their natural condition. To offset this tendency and retain the grains in plump and moist condition, my invention contemplates as a further step, enclosing the treated sweet corn, either on the cob or the grains in bulk, in a substantially moisture proof wrapper. In producing a customer package the wrapped ears or bulk grain may be packed in a carton or the like and frozen therein thus forming a new article of manufacture which may be treated as a staple article of commerce, so long as it is kept refrigerated rather than a perishable food product.

The invention will be best understood and appreciated from a consideration of the following specific illustrations of its application:

In preparing Golden Bantam corn-on-the-cob for storage and distribution to the consumer, the husked ears are first cut to a predetermined uniform length, for example, five inches. The cobs are then cored and the ears blanched for one minute in boiling caustic soda of a concentration of one per cent. They are then removed from the blanching solution, quickly washed in cold water and soaked for five minutes in a .05% solution of hydrochloric acid in order to neutralize any residue of alkali remaining on the corn. After this acid treatment the corn is again washed twice in cold water to remove any trace of acid. The washed ears are then carefully drained and may be slipped into individual moisture-proof transparent envelopes of a material such as moisture-proof cellophane or they may be otherwise protected against loss of moisture by evaporation. The inclosed ears may be then packaged in a suitable carton and quick frozen in any suitable apparatus such, for example, as the Belt Froster disclosed in United States Patent No. 1,773,081, granted August 12, 1930 on an application of C. Birdseye. The fresh moist contents of the carton in this step are converted into a solid frozen block, well adapted for handling in distribution and storage and preserved against deterioration and desiccation for a long period of time. When this product eventually reaches the consumer and is defrosted and cooked, the resulting sweet corn will be found to approximate in its texture the grain structure of young sweet corn but with substantially the full flavor and bulk of mature sweet corn.

The product thus treated may ordinarily be prepared for the table by cooking for six minutes. In this connection it is important to note that the steps of the process to which the sweet corn is subjected reduce the length of time which would otherwise be required for the cooking step. This is an advantage not only from the standpoint of economy and convenience, but because it subjects the corn to a smaller loss of soluble nutritious ingredients than must occur as a result of a longer cooking step.

In preparing whole grain sweet corn, it is desirable to introduce a primary step of blanching the corn-on-the-cob sufficiently to set the milk in the grains. The grains may be then cut from the cob, preferably by any well known cutting machine of commercial type. The whole grains are then washed to free them partially or completely of milk and are then ready for the tendering step. This is effected by immersing the grains for one minute in a two per cent solution of boiling caustic soda. The treated grains are removed from the caustic solution and immediately washed in cold water. In this step the orange colored bits of the cob should be removed and then the treated grains may be soaked for five minutes in a .05% solution of hydrochloric acid. After the acid treatment the whole grain corn is washed twice in water and carefully drained. It may be then inclosed in moisture-proof sheet material such as moisture-proof cellophane and inclosed in cartons. These may be rendered further moisture-proof by sealing in waxed paper such, for example, as regenerated cellulose material. The packaged corn may be finally frozen or quick frozen as above outlined in connection with the corn-on-the-cob and thus preserved and adapted for commerce.

I have described the process of my invention in its application to corn-on-the-cob and whole grain corn preserved by freezing or quick freezing. It will be understood, however, that it may be carried out with good advantage in the preparation of sweet corn for preservation by canning or by dehydration.

In case the corn is to be preserved by canning, the grains may be treated as above set forth in connection with the preparation of whole grain corn and then placed while hot in cans and sealed therein. The sealed cans may be then placed in a retort or autoclave and heated for approximately 70 minutes at a temperature corresponding to about 15 pounds steam pressure.

It should be understood that, as a general thing, I prefer to use sweet corn in the roasting-ear stage as the raw material to be treated. In this stage the grains of the sweet corn are plump and full grown and have a milky content but are not mature or sufficiently ripe to serve as a cereal.

Having thus described my invention, what I claim as new and desire to secure by Letters Patent is:

1. The process of preserving and packaging whole-grain sweet corn which has been removed from the cob, which consists in treating the substantially intact grains with a hot caustic solution to soften or dissolve the outer covering thereof, removing excess liquid from the grains, wrapping the grains so prepared to retard evaporation therefrom, and then freezing the wrapped grains.

2. The process of preserving and packaging sweet corn-on-the-cob, which consists in subjecting relatively mature ears to the action of a hot caustic solution to soften and dissolve the outer covering of the grains, removing the excess solution, and then freezing the ears so treated under conditions which substantially retard the loss of moisture from the treated grains.

3. The process of preserving and packaging sweet corn-on-the-cob, which consists in blanching the ears in the hot dilute solution of an alkali for a short interval, thereby softening and dissolving the outer covering of the grains, removing or neutralizing the excess alkali, enclosing the ears thus prepared to prevent loss of moisture content from the treated grains, and finally freezing the enclosed ears.

4. The process of preserving and packaging sweet corn-on-the-cob, which consists in coring the ears, blanching the cored ears in a boiling 1% solution of caustic soda for a short interval, treating the blanched ears with dilute hydrochloric acid to neutralize the alkali, enclosing the ears thus prepared in substantially moisture-proof wrappers to prevent loss of moisture content from the treated ears, and finally quick freezing the wrapped ears.

5. As an article of manufacture, a consumer package comprising sweet corn on the cob, having its grains substantially chitin-free, the ears being enclosed to retard evaporation from the grains and frozen within a carton or the like.

6. As an article of manufacture, a consumer package comprising whole grain sweet corn having its grains substantially chitin-free, the grains being enclosed in bulk to retard evaporation therefrom, and enclosed and frozen within a sealed carton, or the like.

MILO R. DAUGHTERS.